(12) United States Patent
Petit-Huguenin

(10) Patent No.: US 11,973,807 B1
(45) Date of Patent: *Apr. 30, 2024

(54) COMMUNICATIONS APPROACH AND IMPLEMENTATIONS THEREFOR

(71) Applicant: 8x8, Inc., Campbell, CA (US)

(72) Inventor: Marc Petit-Huguenin, Saratoga, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,060

(22) Filed: Jun. 23, 2022

Related U.S. Application Data

(63) Continuation of application No. 16/792,419, filed on Feb. 17, 2020, now Pat. No. 11,374,985, which is a continuation of application No. 15/978,859, filed on May 14, 2018, now Pat. No. 10,567,443, which is a continuation of application No. 14/553,589, filed on Nov. 25, 2014, now Pat. No. 9,973,546, which is a continuation of application No. 11/384,967, filed on Mar. 20, 2006, now abandoned.

(51) Int. Cl.
| | |
|---|---|
| *H04L 29/06* | (2006.01) |
| *H04L 65/1046* | (2022.01) |
| *H04L 65/1069* | (2022.01) |
| *H04L 65/1104* | (2022.01) |
| *H04M 7/00* | (2006.01) |

(52) U.S. Cl.
CPC ...... *H04L 65/1069* (2013.01); *H04L 65/1046* (2013.01); *H04L 65/1104* (2022.05); *H04M 7/0066* (2013.01); *H04M 7/0075* (2013.01)

(58) Field of Classification Search
CPC ............. H04L 65/1069; H04L 65/1006; H04L 65/1046; H04M 7/0066; H04M 7/0075
See application file for complete search history.

(56) References Cited

U.S. PATENT DOCUMENTS

| | | | | |
|---|---|---|---|---|
| 6,490,550 | B1 * | 12/2002 | Hiri ..................... | G10L 19/0018 704/235 |
| 2002/0001302 | A1 * | 1/2002 | Pickett ................ | H04L 12/6418 370/352 |
| 2003/0007483 | A1 * | 1/2003 | Um .................... | H04Q 11/0478 370/352 |
| 2005/0185773 | A1 * | 8/2005 | Burger ................. | H04M 7/006 379/88.01 |

\* cited by examiner

*Primary Examiner* — Luat Phung
(74) *Attorney, Agent, or Firm* — Crawford Maunu PLLC

(57) ABSTRACT

A connection procedure for data communications devices is implemented in a variety of embodiments. In one such embodiment, the procedure uses a first set of connection data for attempting to connect and upon failure to connect uses a second set of connection information in addition to the first set of connection information to attempt a connection. In another embodiment, a delay is implemented before transmitting the connection information and a subsequent delay is implemented to allow for additional connection information to be input and transmitted.

20 Claims, 5 Drawing Sheets

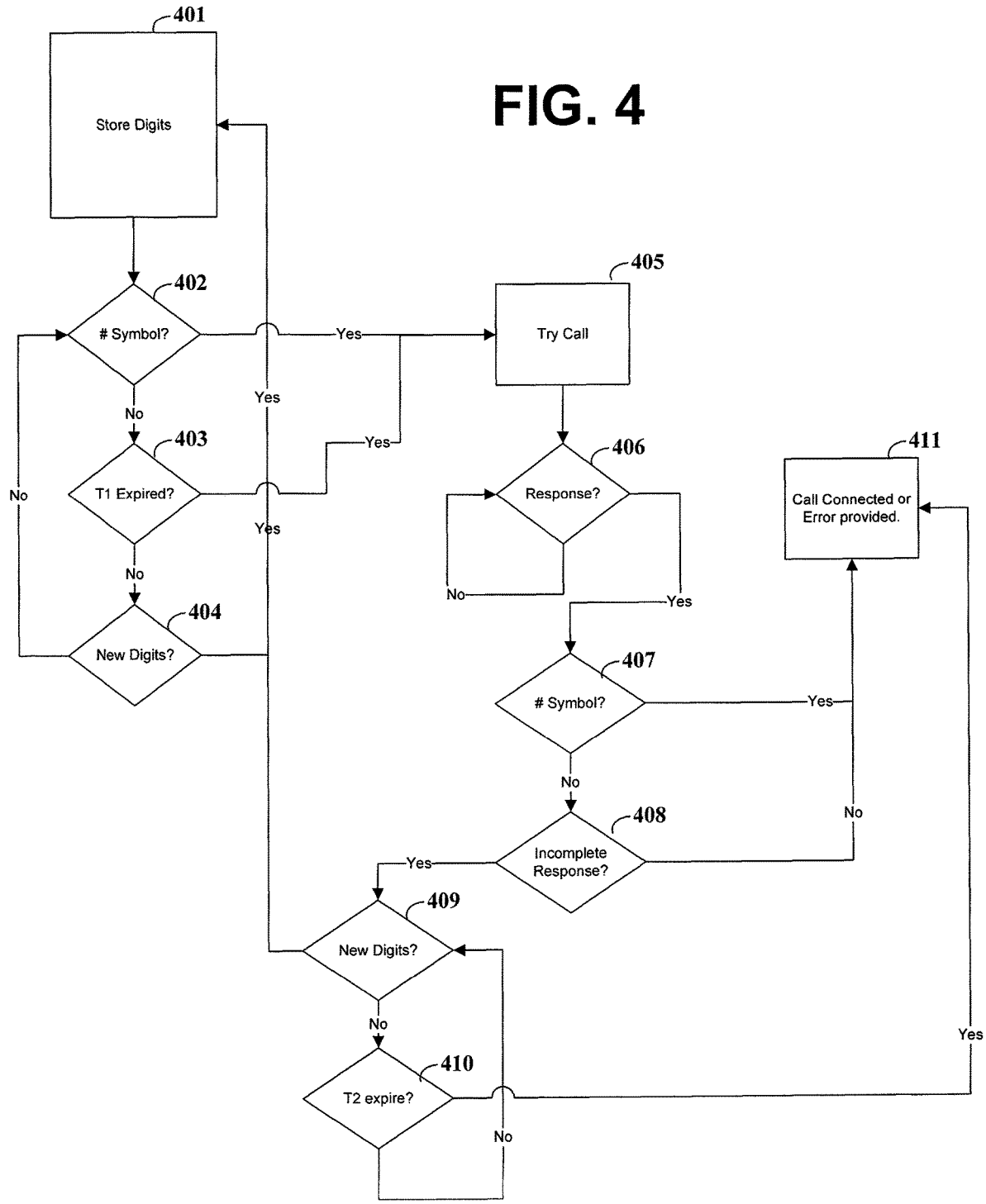

COMMUNICATIONS APPROACH AND IMPLEMENTATIONS THEREFOR

FIELD OF THE INVENTION

The present invention relates generally to approaches to data communications and more particularly to a procedure involving a user that facilitates establishing data and/or telephony communications as might traditionally be achieved by a Voice-Over-Internet Protocol (VoIP) server.

BACKGROUND

Telephony services are offered through a variety of avenues, such as landline phones, cellular phones, and more recently, VoIP. In the most common data-communication/telephony services, there is a first user of the service (e.g., the dialer) and a second user of the service (e.g., the called party). In order for the first user to establish communications with a desired party, the first user is required to input a telephony identifier that corresponds to the desired party. In the telephony/VoIP context, a common example of such an identifier is a telephone number.

In VoIP services, data communications are provided using Internet protocols rather than the traditional phone service. When an audible call is sent via a VoIP server, the server is simply sending data that represents the audio of the user. One such Internet protocol is Session Initiation Protocol (SIP). SIP is a signaling protocol used for a variety of data communications including as non-limiting examples, Internet conferencing, telephony, events notification, and instant messaging. Communications devices use SIP to establish a connection, over the Internet, with each other.

When attempting to initiate a call, the communications device sends a destination identifier (e.g., telephone number) to the communications facility. The communications facility uses the destination identifier to determine the party with which to establish a connection. Under this process of establishing a connection, it is desirable that the communications device allows enough time for the caller to enter the entire destination identifier while initiating a connection attempt soon after the entering of the destination identifier has been completed. These seemingly competing goals are complicated by a number of issues. For instance, destination identifiers can vary in length depending upon different factors such as the location of the caller and the called party (e.g., whether the call is local, long distance, or international). Due to this variance in the length of the telephone number, the communications device cannot readily determine whether the attempt to enter the destination identifier is complete.

Various approaches are employed to facilitate such VoIP calls. These approaches, however, leave room for improvement. For example, some SIP communication devices implement a timed delay before initiating the call to ensure that the dialer has completed entering the destination identifier. Generally, the timer begins running after a digit is pressed and is reset every time a new digit is pressed. The delay must be long enough to account for the manual entering of digits so as to avoid initiating a connection before destination-identifier effort has been finished. This method, however, results in a delay between the time the caller finishes entering the destination identifier and the time the call is initiated.

Another approach involves allowing the user to indicate that they have completed the entering of information. For example, the caller may press a special character or button that indicates the number or destination identifier is believed to be complete. While this approach can sometimes speed the dialing procedure, the practical application often exhibits problems. First, the initiating parties should be made aware of how to utilize the method. Second, even if aware of how the method functions, initiating parties may be unwilling to implement it or they may simply forget about the method.

These and other issues have presented challenges to the implementation of data communications, including those involving SIP and similar applications.

Overview

The claimed invention is directed to overcoming the above-mentioned challenges and others related to a variety of data communications. The present invention is exemplified in a number of implementations and applications, some of which are summarized below.

Various example embodiments of the present invention are directed to the facilitation of data communications approaches used with VoIP-type servers, such as those using SIP communication devices (smart phones, IPADs, etc.).

Aspects of the invention may be more completely understood in consideration of the detailed description of various embodiments of the invention that follows in connection with the accompanying drawings, in which:

FIG. 4 shows a flow diagram for processing dialed numbers for use in a VoIP communications system, according to another example embodiment of the present invention.

Figure 1:
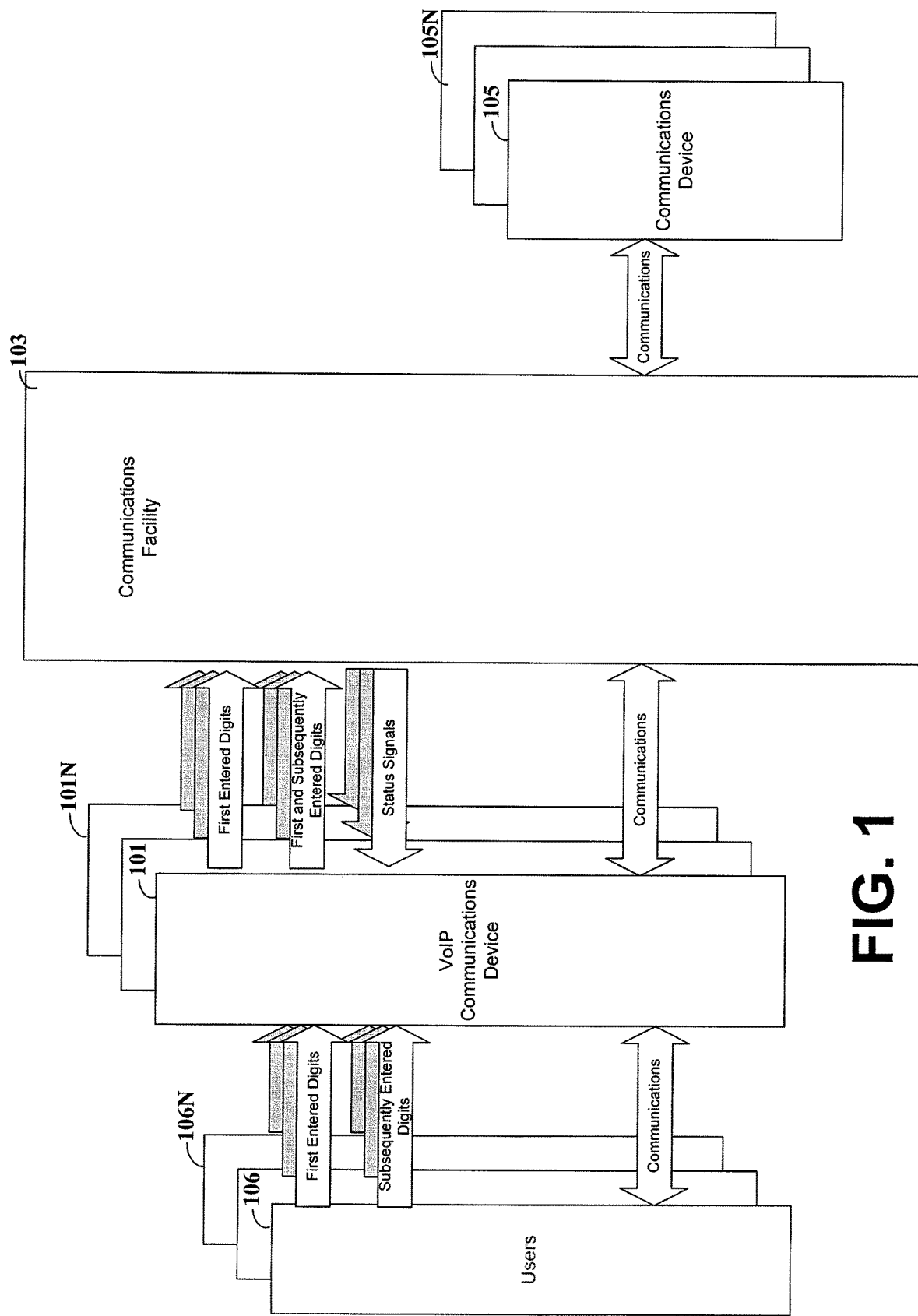
FIG. 1 is a VoIP communications system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Consistent with the present disclosure, aspects are believed to be useful for a variety of different applications, and the invention has been found to be particularly suited for data communications including those associated with VoIP communications, such as those communications amenable for use with SIP compatible devices. While the present invention is not necessarily limited to such applications, various aspects of the invention may be appreciated through a discussion of several examples using this context.

According to an example embodiment of the present invention, a VoIP communications device is implemented using a dialing procedure that facilitates the speed with which communications can be established using standard telecommunications facilities and protocols. The system includes a communications device connected to a telecommunications facility for implementing an improved dialing procedure. Using the system, the time required to establish a connection between communication devices can be reduced.

The process begins when a dialer inputs connection information via an input device (e.g., presses numbers on a keypad). Next, a control circuit attempts to establish a connection based upon the connection information. The control circuit is further capable of receiving and storing additional connection information subsequent to the attempted connection. If the connection is successful, the dialing procedure is complete. If, however, the attempted connection fails, the control circuit is capable of using the additional connection information to attempt another connection. This capability allows the control circuit to implement a minimal delay prior to the first attempted connection without sacrificing the total time a dialer is allotted to input the complete connection information.

In one implementation, the system is configured to provide VoIP communications using SIP. The system is connected to an SIP server that includes a dial map of acceptable numbers. When the system attempts a connection, the SIP server checks the number provided by the system against the dial map. If the SIP server determines that the number provided is acceptable, a connection is established to the corresponding communications device. If, however, the server determines that the number is not acceptable, system does not establish a connection.

The SIP server is capable of providing status indicators corresponding to the attempted connection. In one embodiment, the SIP server can provide an "incomplete" response indicating that the phone number does not have sufficient digits. If such a response is provided to the system, the system waits for additional data from the dialer. If the dialer provides additional data, the system attempts to establish a connection using the additional data. Should an acceptable wait time be exceeded, the system ends the dialing procedure and provides a status indicator to the dialer.

Turning now to the figures, FIG. 1 is a telephony-based communications system, according to an example embodiment of the present invention. The system includes users 106 to 106N, communications devices 101 to 101N, a communications facility 103, and communications devices 105 to 105N. In some applications, a single communications device 101 (or 105) might be implemented. For simplicity, a single communications device is assumed in the following description of FIG. 1. In another example embodiment, the communications device 101 is configured to provide VoIP communications using SIP.

Communications devices 101 to 101N comprise a number of VoIP devices including, but not limited to, telephones, video phones, and wireless telephones. The communications device 105 and 105N can be implemented in a number of different manners. For instance, communications device 105 can be a VoIP device, a standard telephone device, or any other device capable of interfacing with VoIP communications device 101.

User 106 uses communications device 101 to establish communications with a second communications device (such as communications device 105). In one embodiment, communications device 101 is a VoIP telephone or videophone that includes a keypad or similar means to enter data. After the data is entered, communications device 101 uses the required protocol to attempt a connection through communications facility 103 to communications device 105. In one embodiment, the data entered by user 106 is a telephone number corresponding to communications device 105. As discussed above, telephone numbers have varying lengths, and thus, the length of the telephone number is often uncertain. Communications device 101 is capable of providing the connection data to the communications facility 103 using the first set of entered data after a minimal delay because communications device 101 is capable of receiving and using second set of subsequently entered data.

After the first set of data is used to attempt a connection through the communications facility 103, the communications facility 103 provides status signals indicative of the connection attempt. If the connection attempt is successful, communications between communications device 101 and communications device 105 can be established. If, however, the connection attempt is unsuccessful, the communications device 101 allows the user 106 to enter a second set of data. Upon receipt of additional data from user 106, the communications device 101 can attempt a connection using both the first and second set of data. The communications facility 103 again provides status signals indicative of the connection attempt. If the connection attempt is successful, communications between communications device 101 and communications device 105 can be established. If the connection attempt is not successful, the process can be repeated until either the connection attempt is successful, the user ceases to enter additional data, or the status signals indicate additional data would not be useful in establishing a connection (e.g., the data exceeds the longest possible telephone number or does not otherwise conform to a partial number).

Figure 1A:
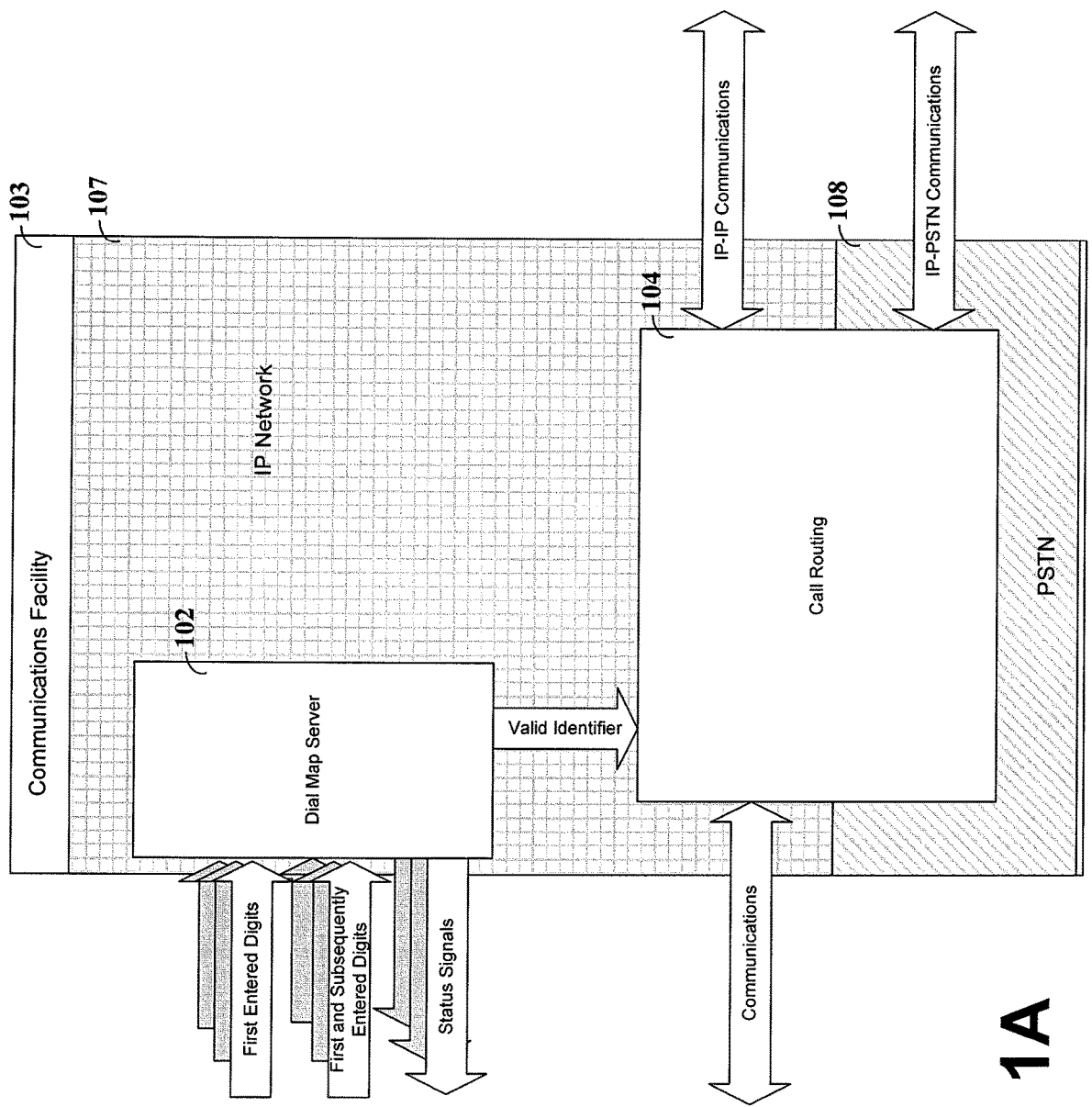
FIG. 1A shows an example of a communications system of FIG. 1, according to an example embodiment of the present invention.

FIG. 1A shows a more detailed exemplary communications facility to which the communications device 105 can be connected. The communications facility 103 contains an Internet Protocol (IP) network 107 and a public-switched-telephone-network (PSTN) 108. Communications device 105 typically interfaces the communications facility 103 via the IP network 107. When the entered data is sent to the IP network 107 from communications device 101, the communications facility 103 attempts to establish a connection with a communications device that corresponds to the data supplied. Dial map server 102 determines whether the data supplied corresponds to any known telephone numbers. If dial map server 102 determines that there is a corresponding telephone number, the dial map server 102 connects to a device associated with the telephone number (e.g., a communications device at a corresponding physical location) using call routing block 104, and if successful, indicates to communications device 101 that a connection has been established. Call routing block 104 is shown as spanning both the PSTN 108 and IP network 107 because the second communications device 105 might not have a direct connection to the IP network 107. For example, the second communications device might be a standard telephone that interfaces with a local PSTN. Thus, call routing block 104 can establish communications with communications devices having any number of different interfaces with the communications facility. Regardless of the interface for the second communications device, once communications device 101 accepts the connection, the dialing procedure is effectively ended.

If the dial map server 102 determines that there is not a corresponding telephone number, then dial map server 102 indicates so with the status indicators. These status indicators are supplied to communications device 101. Based upon the status indicated by the dial map server 103, the communications device either waits for additional data to be entered by user 106, or provides an indication of the status of the call to user 106. User 106 inputs additional data, and communications device 101 attempts a connection using the additional data in conjunction with the previous data. Generally, this entails adding the new digits to the end of the digits stored thus far. Communications facility 103 then follows the procedure described above for attempting to connect to a corresponding communications device.

Figure 2:
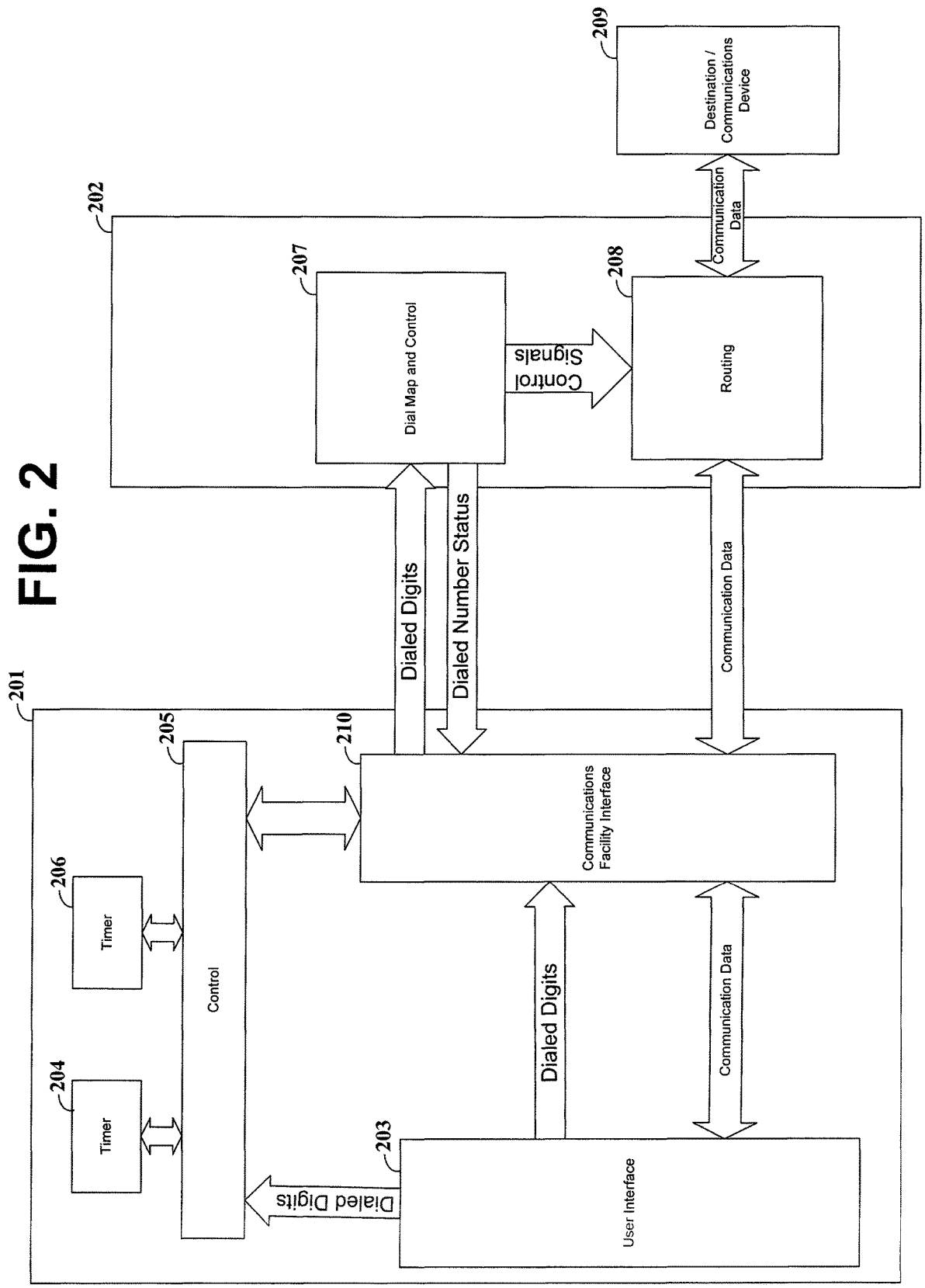
FIG. 2 is a VoIP communications system, according to another example embodiment of the present invention.

FIG. 2 is a telephony-based communications system, according to another example embodiment of the present invention. The system includes a communications device 201, a communications facility 202, and a second communications device 209. In some applications, the communications device 201 is configured to provide VoIP communications using SIP.

Communications device 201 includes an input/output device 203, a timer 204, a timer 206, and a control 205. Input/output device 203 allows user 106 to input data, including, but not limited to, telephone numbers and communication data (e.g., voice and video data). One example embodiment is a telephone device that includes a keypad, a microphone, and a speaker. In this embodiment, the dialer uses the keypad to indicate the telephone number corresponding to the destination device 209. Each time a digit is entered, timer 204 provides a reference to the digit's entry time. Control unit 205 stores the digits entered and uses timer 204 to determine when to send the dialed digits to the communications facility 202 using communications facility interface 210. For example, controller 205 might determine that if one second has elapsed since the last digit was entered, the dialed digits should be provided to the communications facility.

This delay can be set to a relatively low value because control unit 205 is capable of handling additional digits entered after the dialed digits are sent to the communications facility 202. If the dialer enters additional digits, controller 205 stores the digits using a suitable memory device.

In one embodiment, the communications facility interface is capable of sending connection data and receiving connection status data. For instance, the communications facility interface might be implemented to provide VoIP communications using SIP.

The communications facility 202 compares the data supplied by communications device 201 to a dial map 207 containing acceptable numbers. If a match is found, dial map 207 uses routing block 208 to establish a connection between communications device 201 and destination device 209. If no match is found, then a connection is not established. In either case, dial map 207 provides control 205 with status indicators relating to the state of the attempted connection.

If the dialer enters additional data and dial map 207 indicates that a connection has not been established, control 205 is capable of attempting to send the additional data along with the original data via communications facility interface 210. Control 205 waits for the delay of timer 204 prior to sending the new connection attempt. Whether or not control 205 attempts to send the additional data may also be determined by the type of status indicator received from dial map 207.

In one embodiment, dial map 207 is capable of providing a status indication for a number that is "incomplete" (requires more digits). Upon receiving an incomplete indication, timer 206 is configured to provide a time reference corresponding to the incomplete indication. The time reference of timer 206 is used to determine an acceptable amount of time after receiving an incomplete indication to delay before transmitting connection information to communications facility 210. Until the delay time is exceeded, control 205 waits for new data to be entered by the dialer. If the delay time is exceeded prior to new data being provided, then control 205 stops accepting input from the dialer and ends the dialing procedure. Prior to ending the dialing procedure the dialer is allowed sufficient time to input additional digits; for this reason, timer 206 is often implemented with a delay longer than that of timer 204. In some embodiments, control 205 can also provide an appropriate error message. If, however, new data is entered prior to the delay time, control 205 sends this data to dial map 207 in the aforementioned manner.

If dial map 207 provides status indicating a condition other than an incomplete number or an established connection, then control 205 may end the dialing procedure while providing an appropriate status message.

The components of FIG. 2 may be implemented in a variety of manners. In one embodiment, control 205 can be implemented as an electrical circuit, a programmable logic device, a processor or combinations thereof. In another embodiment, control 205 and timers 204 and 206 can be implemented using one electrical circuit, programmable logic device, or processor. User interface 203 may include various different types of input and outputs, such as keypads/keyboards, audio interfaces (microphones and speakers) and visual interfaces (visual displays and cameras). Various other implementations exist that do not deviate from the spirit of the instant invention.

Figure 3:
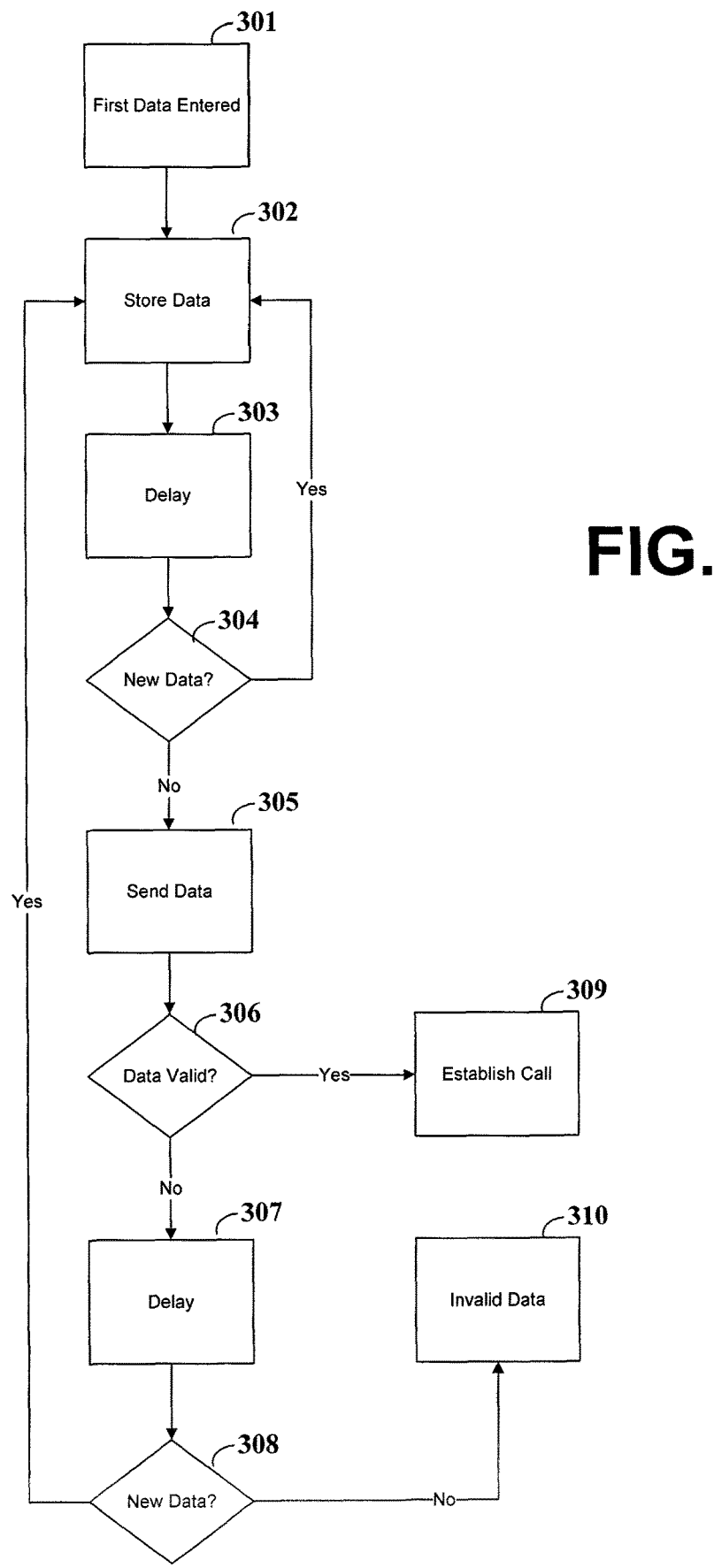
FIG. 3 shows a flow diagram for processing dialed numbers for use in a VoIP communications system, according to another example embodiment of the present invention.

FIG. 3 shows a flow diagram for processing dialed numbers for use in a telephony-based communications system, according to another example embodiment of the present invention.

At block 301, the processing begins when the dialer first enters data. In one embodiment, the dialer enters a telephone number using a keypad or other means. Once data has been entered, the process proceeds to block 302.

At block 302, the data signals received in block 301 are stored using a suitable storage device. The data may be stored using a database, computer memory, or any equivalent means.

At block 303, an acceptable delay is implemented to allow the dialer sufficient time to input additional data signals. In one embodiment, the system is capable of recording multiple data inputs during the delay. In an alternate embodiment, as soon as a new digit is input, the delay is bypassed. Each of these methods ensures that data is not lost when it is input rapidly (e.g., when a dialer inputs two or more consecutive digits in a time less than the delay time of block 303).

At block 304, a determination is made as to whether any new data has been supplied since the data was stored in stage 302. If new data has been supplied, the process repeats starting at block 302, which stores the newly entered data. If no new data has been entered, the process proceeds to block 305.

At block 305, the data entered by the dialer is sent to the communications facility. The data is sent via protocols defined by the communications facility. One example of such a protocol is SIP as used for VoIP applications. Typically, telephony protocols require that, in a request for a connection, the entire telephone number is sent to the communications facility. This precludes sending a partial number in a request followed by the remainder of the number in a different request. For this reason, the process assumes, at least temporarily, that the dialer has completed entering data and sends the data stored so far. If the dialer enters additional data, the data can be recorded for possible use later in the process.

The communication facility processes the data supplied from block 305 and returns a status indicator in relation to the connection status. Numerous status indicators can be provided, for example, established connection, incomplete number, invalid number, or unresponsive called device.

At block 306, a determination is made using the status information supplied by the communications facility. If the status information indicates that a call has established connection with the desired communications device, then there is no need to obtain additional data from the dialer. Accordingly, the process proceeds to block 309.

If, on the other hand, the status information indicates that a call has not been established, then additional data may be required from the dialer. Thus, the process proceeds to block 307. In an alternate embodiment, additional determinations can be made based upon the status information. For example, the status information may indicate that additional data is not needed from the dialer, and the process could proceed directly to block 310.

At block 307, the data supplied thus far has proven to be insufficient in establishing a connection to another communication device. For this reason, a delay is implemented to allow for a dialer to complete the dialing. An alternate embodiment allows for the delay to be bypassed if new data has been supplied prior to the delay beginning, or is supplied before the delay completes. In either case, the process proceeds to block 308 upon completion of the delay phase.

At block 308, a determination is made as to whether new data has been supplied since data was last stored in block 302. If new data was supplied, the process returns to block 302 to store the new data, and the remainder of the process repeats. If no new data was supplied, the process proceeds to block 310.

At block 309, the dialing process has been completed. The process enables communication between the devices and can be reset to block 301 when another connection is desired.

At block 310, the dialing process is terminated because the process was unable to establish a connection with another communication device using the data supplied by the dialer. In one embodiment, the process can provide the dialer with a message corresponding to the status provided by the communication facility prior to termination of the call.

FIG. 4 shows a flow diagram for processing dialed numbers for use in a telephony-based communications system, according to another example embodiment of the present invention.

At block 401, data is received from the communications device. In one embodiment, the dialer enters a telephone number using a keypad or similar means. Accordingly, the data is provided as single digits entered in succession. Once a digit has been entered, block 401 stores the digit, and the process proceeds to block 402.

At block 402, a first determination is made as to whether the digit provided is a special symbol that indicates that the telephone number entry has been completed by the dialer. An example of a special symbol is the pound symbol as used by a conventional SIP dialing device. In SIP, the dialer enters the pound symbol to indicate completion of the telephone number. If it is determined that a special symbol has been entered, the telephone number entry is considered complete, and the process proceeds to block 405. Conversely, if it is determined that no special symbol has been entered, the process proceeds to block 403 where a second determination is performed.

At block 403, the second determination is based upon the amount of time that has passed since the last data was received from the dialer. If this time exceeds an acceptable time, the dialer is considered, at least temporarily, to have completed inputting telephone number digits, and the process proceeds to block 405. If the time since the last data was entered does not exceed the acceptable time, then the process proceeds to block 404. The timer function can be implemented in numerous ways. In one example implementation, the timer begins running after the dialer inputs a digit and is reset when the dialer enters another digit. When the timer reaches a certain value, the acceptable delay time has been exceeded. In another example implementation, the timer is implemented using a continuously running clock, such as a real-time clock. The time associated with the most recently entered digits is recorded and compared against the current time to determine when the acceptable delay has been exceeded.

At block 404, a determination is made as to whether or not any new data has been inputted by the dialer. If no new information has been supplied since the last data was stored in block 401, then the process proceeds to block 402. Thus, the process repeats steps 402, 403, and 404, until one of following three conditions are met: 1) a special symbol is entered by the dialer; 2) the time between data entry exceeds the acceptable time; or 3) new data is entered by the dialer.

If it is determined that the dialer has input new data, then the process proceeds to block 401 and repeats the steps described above.

At block 405, the data received thus far (minus the special symbol) is sent to the communication facility as if the dialer has provided the entire telephone number. The process then proceeds to block 406.

At block 406, a determination is made based upon whether a response (status indicator) has been received from the communications facility. If no response has been received from the communications facility, then the process remains at block 406. Once it is determined that a response has been received from the communications facility, the process proceeds to block 407. If the user has entered a special symbol, e.g., a pound symbol, then the process proceeds to block 411.

At block 408, a determination is made as to whether the response provided by the communication facility indicates that the data provided in block 405 is incomplete. Examples of responses provided by the communications facility include, but are not limited to, an established call, an incomplete number, an invalid number, or an unresponsive called device. If the response indicates a status other than incomplete, the process proceeds to block 411. If, however, the response indicates that the data is incomplete, the process proceeds to block 409.

At block 409, a determination is made as to whether a new digit has been provided by the dialer subsequent to the last storing of digits in block 401. The combination of an incomplete indication from the communications facility (as determined in 408) and a new digit entered by the dialer (as determined in 409) generally indicates that the dialer did not complete entering the telephone number. Thus, if it is determined that a new digit has been entered, the process proceeds to block 401 where the new digit is stored according to the aforementioned process. If no new digit has been entered, then the process proceeds to block 410.

At block 410, a determination is made as to whether an acceptable time has been exceeded since the incomplete response was received. If the acceptable time has been exceeded, then the process assumes that the dialer has finished entering the telephone number. Thus, if it is determined that the acceptable time has been exceeded, the process ceases to wait for new digits from the dialer and proceeds to block 411.

If the acceptable time has not been exceeded, the process continues to wait for new digits to be entered. Accordingly, the process continues to check for the first of either a new digit being input (and proceed to block 401) or the acceptable time being exceeded (and proceed to block 411).

At block 411, the process ends the dialing process and either connects the communication devices (in the case of an "established" response) or provides an appropriate error message.

The various embodiments described above are provided by way of illustration only and should not be construed to limit the invention. Based upon the above discussion and illustrations, those skilled in the art will readily recognize that various modifications and changes may be made to the present invention without strictly following the exemplary embodiments and applications illustrated and described herein. For instance, such changes may include the use of a protocol other than SIP. Other changes may include the use of the invention for communication devices that do not use the Internet. Such modifications and changes do not depart from the true spirit and scope of the present invention, which is set forth in the following claims.

What is claimed is:

1. For use by a communication device in a system having a communications facility, a method comprising:
    for a first set of connection information that has a destination address for a first connection request, comparing the first set of connection information to a data table of known destination addresses, wherein the destination address for the first connection request is represented by a first set of identifier signals received via user input, to the communications facility;
    determining, based on status signals corresponding to the first set of connection information and indicative of a comparison of the first set of connection information and the known destination addresses, whether to establish communications between the communication device and a second voice communication device; and
    transmitting to the communications facility, based on the status signals and in response to receiving a second set of identifier signals, a second set of connection information associated with another destination address for a second connection request, the destination address for the second connection request being different than the destination address for the first connection request, the second set of connection information including at least one of: the first set of identifier signals, the second set of identifier signals, and a combination thereof.

2. The method of claim 1, wherein the status signals include an indication of incomplete connection information due to insufficient digits in a destination address.

3. The method of claim 1, wherein the transmitting of the first set of connection information is responsive to an expiration of a first timer corresponding to a predetermined time relative to receipt of the first set of identifier signals.

4. The method of claim 1, further including maintaining the data table of known destination addresses.

5. The method of claim 1, wherein the system includes a communications facility interface circuit that maintains the data table of known destination addresses.

6. The method of claim 1, further including: receiving input data from a user; and comparing, via a logic circuit, the input data and additional user input data to the known destination addresses; and establishing communications to the communications device in response to the logic circuit finding a corresponding match to one of the known destination addresses.

7. The method of claim 6, wherein the logic circuit includes computer circuitry.

8. The method of claim 6, wherein the logic circuit includes computer circuitry operated at or on behalf of the communications facility.

9. The method of claim 6, further including:
    obtaining the additional user input data and causing a new connection in response to the timing of the receipt of the additional user input data; and
    wherein the new connection is responsive to the predefined delay being exceeded as indicated via a continuously running clock implemented by a timer circuit.

10. The method of claim 1, further including: receiving from a user input data that represents digits; and providing a reference indicative of each time data representing one of the digits is input by the user.

11. The method of claim 10, further including collecting, via logic circuitry and a timer circuit, the user input data as sequentially-entered ones of the inputs beginning with a first input and including certain of the sequentially-entered ones of the inputs that are received within a predetermined time relative to receipt of an immediately previous one of the inputs.

12. The method of claim 11, wherein the predetermined time is independent of a number of the digits that are input by the user, and to transmit the second connection request, including collected data representing the digits.

13. The method of claim 1, wherein the transmitting of the first set of connection information is responsive to an expiration of a first timer, wherein transmitting the second set of connection information includes transmitting the second set of connection information in response to receiving the second set of identifier signals prior to the expiration of a second timer and after the expiration of a second expiration of the first timer.

14. The method of claim 13, wherein:
    transmitting the second set of connection information includes transmitting the second set of connection information in response to a second expiration of the first timer.

15. The method of claim 13, wherein
    transmitting the second set of connection information includes transmitting the second set of connection information in response to a second expiration indicated via the first timer.

16. The method of claim 1, further including collecting, after a new connection in response to the second connection request, additional user input data representing additional digits.

17. The method of claim 1, further including:
    generating and transmitting a request for a new connection in response to the status signals indicating that a connection has not been established after transmitting the connection information associated with another destination address for a second connection request.

18. The method of claim 1, wherein the second set of connection information includes both the first set of identifier signals and the second set of identifier signals.

19. For use by a user-based communication device in a system having a communications facility, a method comprising:
    for a first set of connection information that has a destination address for a first connection request, comparing the first set of connection information to a data table of known destination addresses, wherein the destination address for the first connection request is represented by a first set of identifier signals received via user input, to the communications facility;

determining, based on status signals corresponding to the first set of connection information and indicative of a comparison of the first set of connection information and the known destination addresses, whether to establish communications between the user-based communication device and a second voice communication device;

transmitting to the communications facility, based on the status signals and in response to receiving a second set of identifier signals, connection information associated with another destination address for a second connection request and that is different than the destination address for the first connection request;

generating and transmitting a request for a new connection in response to the status signals indicating that a connection has not been established after transmitting the connection information associated with the other destination address for the second connection request; and effecting the new connection request while providing time for user entry of input data, by permitting the user to input additional digits for completing a set of the identifier signals after transmitting the new connection request including an incomplete set of the identifier signals.

20. The method of claim 19, wherein generating and transmitting the request for the new connection includes transmitting connection information including at least one of: the first set of identifier signals, the second set of identifier signals, and a combination thereof.

* * * * *